United States Patent [19]

Bartak

[11] 4,263,161

[45] Apr. 21, 1981

[54] LIQUID FOR WATERPROOFING A MASONRY STRUCTURE

[76] Inventor: Gottlieb Bartak, Hirschgasse 36, A-4020 Linz, Austria

[21] Appl. No.: 70,313

[22] Filed: Aug. 27, 1979

Related U.S. Application Data

[63] Continuation-in-part of Ser. No. 965,329, Dec. 1, 1978, abandoned.

[30] Foreign Application Priority Data

Dec. 1, 1977 [AT] Austria ............................ 8587/77

[51] Int. Cl.$^3$ ................................................ C09K 3/00
[52] U.S. Cl. .................................. 252/182; 52/169.14; 106/2; 260/31.4 R
[58] Field of Search ................. 52/169.14; 106/2, 311; 8/192; 260/31.4 R; 252/182

[56] References Cited

U.S. PATENT DOCUMENTS

| | | | |
|---|---|---|---|
| 3,985,688 | 10/1976 | Speech | 252/182 X |
| 4,108,954 | 8/1978 | Hilternaus et al. | 260/31.4 R X |

FOREIGN PATENT DOCUMENTS

259190 1/1968 Austria .
761385 11/1956 United Kingdom .................. 52/169.14

*Primary Examiner*—Harris A. Pitlick
*Attorney, Agent, or Firm*—Kurt Kelman

[57] ABSTRACT

A liquid for waterproofing a masonry structure contains 20–50% of a diisocyanate and to-50% of a solvent mixture consisting of 40–60% of ethylene glycol monoethyl ether acetate or methylisobutylketone and 60–40% of toluene, all percentages being by weight.

4 Claims, No Drawings

LIQUID FOR WATERPROOFING A MASONRY STRUCTURE

This is a continuation-in-part application of my copending application Ser. No. 965,329, filed Dec. 1, 1978, now abandoned.

The present invention relates to an improved liquid for waterproofing a masonry structure, such as a wall built from bricks or other masonry material defining capillaries throughout the structure.

In my Austrian patent No. 259,190, I have proposed water-proofing masonry structures with a liquid diisocyanate-based synthetic resin which sets in the presence of moisture in masonry impregnated with the liquid. The liquid synthetic resin is a solution of diisocyanate in a solvent mixture of ethyl acetate, ethylene glycol monoethyl ether acetate, commercial known as "Cellosolve" acetate, and toluene. This liquid is lighter than water and, therefore, diffuses well through moist masonry, filling its capillaries so as to prevent infusion of additional moisture into the masonry structure after the resin has set therein, which takes up to four weeks. This impregnant also is resistant to weak acids and bases without reducing the "breathing" capacity of the masonry structure. No efflorescence occurs and even the heat insulating capacity of the masonry is improved by this impregnation.

According to the patent, the liquid synthetic resin is injected into holes drilled into the masonry structure under pressure, for example by means of compressed air. This pressure injection is not only quite costly but, under certain circumstances, it may endanger the structure or damage it, for instance by removing plaster or the like if the pressure is too high.

It is the primary object of this invention to retain all the advantages of the waterproofing agent of my Austrian patent while overcoming the noted disadvantage and to provide such an agent which may be used for impregnating a masonry structure without the use of pressure.

The above object is accomplished according to the invention with a highly diffusive liquid for waterproofing a masonry structure, which contains 20% to 50% of a diisocyanate and 80% to 50% of a solvent mixture consisting of 40% to 60% of ethylene glycol monoethyl ether acetate or methyl-isobutyl-ketone and 60% to 40% of toluene, all percentages being by weight.

The use of ethylene glycol monoethyl acetate in the solvent mixture is preferred because of the unpleasant odor of methylisobutylketone. The preferred diisocyanate is toluene diisocyanate, such as sold by Bayer AG of Leverkusen, Germany, under the trademarks "Desmodur L" or "Desmodur N". A particularly useful diisocyanate component for the waterproofing liquid consists of toluene diisocyanate dissolved in a trivalent alcohol, the solution being comprised of about 75%, by weight, of the diisocyanate and 25%, by weight, of the alcohol, sold by Bayer AG under the trademarks "Desmodur L 75" and "Desmodur N 75".

I have found the most effective waterproofing liquid to contain, by weight, about 40% of the diisocyanate, about 30% of the acetate and about 30% of toluene. This provides an excellent seal for the capillaries and simulaneously hardens the masonry (plaster and brick).

It has been found unexpectedly that the indicated liquid using diisocyanate, instead of a diisocyanate-based resin, in the specifically indicated proportion in a solvent mixture consisting of the specifically indicated solvents in the indicated proportion is so highly diffusive that it makes pressure injection unnecessary. The liquid is simply poured into holes drilled into masonry structure, for instance from a watering can or a hose. I have obtained excellent results with bore holes having a diameter of about 20–30 mm drilled into one side of a masonry wall in at least three rows, the holes in each row and from row to row being spaced apart about 20 cm. The holes in adjacent rows were staggered and extended downwardly at an angle of about 30° for about two thirds of the thickness of the wall. If both sides of the wall were to be waterproofed, the holes were drilled into both sides to a depth corresponding to half the wall thickness, in which case two rows of holes were sufficient. After the drilling, the drill dust was blown out of the holes, the masonry wall was doused to wet it down and the empty holes were filled several times with the waterproofing liquid. It tended to seep into the wall through the capillaries, and the holes were refilled until the wall was impregnated with the liquid, which was indicated by the fact that liquid tended to remain in the holes. In addition, the waterproofing liquid was also applied to the side of the wet wall. The waterproofing liquid is applied at ambient temperatures of about 20° C., a range of about 5° C. to 50° C. being useful.

After about 24 hours, the liquid is cured in the wall to form a hydrophobic barrier preventing either the rise or percolation of moisture therethrough. At that point, the holes are closed again by filling them with cement. The cured hydrophobic barrier is a water insoluble thermosetting synthetic resin which "breathes" and has replaced the moisture in the masonry capillaries.

What is claimed is:

1. A liquid for waterproofing a masonry structure, which contains 20% to 50%, by weight, of a diisocyanate and 80% to 50%, by weight, of a solvent mixture consisting of 40% to 60%, by weight, of ethylene glycol monoethyl ether acetate or methylisobutylketone and 60% to 40%, by weight, of toluene.

2. The waterproofing liquid of claim 1, wherein the diisocyanate is toluene diisocyanate.

3. The waterproofing liquid of claim 2, wherein the toluene diisocyanate is dissolved in a trivalent alcohol, the solution being comprised of about 75%, by weight, of the diisocyanate and 25%, by weight, of the alcohol.

4. The waterproofing liquid of claim 2 or 3, containing about 40%, by weight, of the diisocyanate, about 30%, by weight, of ethylene glycol monoethyl ether acetate and about 30% by weight, of toluene.

* * * * *